Figure 2:
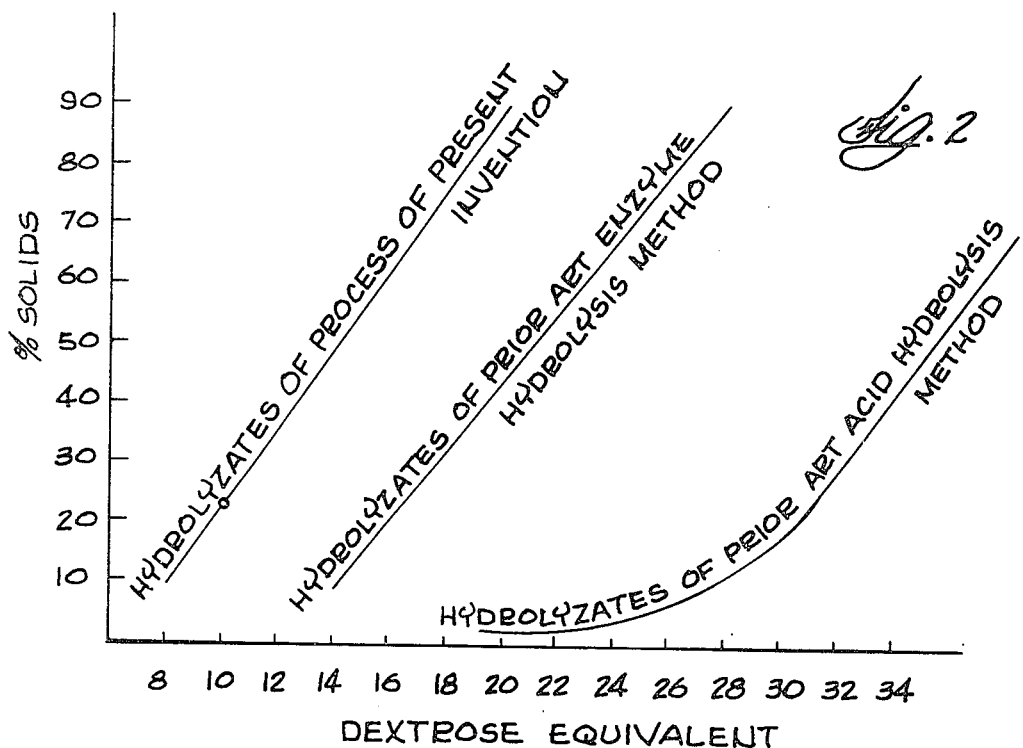

United States Patent
Morehouse et al.

[15] 3,663,369
[45] May 16, 1972

[54] HYDROLYSIS OF STARCH

[72] Inventors: Alpha L. Morehouse; Ronald C. Malzahn; John T. Day, all of Muscatine, Iowa

[73] Assignee: Grain Processing Corporation, Muscatine, Iowa

[22] Filed: Feb. 23, 1968

[21] Appl. No.: 707,557

[52] U.S. Cl. ................................................195/31, 99/142
[51] Int. Cl. ..........................................................C12b 1/00
[58] Field of Search......................195/31, 17; 99/141, 141 A, 99/142

[56] References Cited

UNITED STATES PATENTS

| | | | |
|---|---|---|---|
| 3,280,006 | 10/1966 | Hurst et al. | 195/31 |
| 3,320,074 | 5/1967 | Gebhardt | 99/141 |
| 3,325,296 | 6/1967 | Braaten | 99/141 |
| 3,490,922 | 1/1970 | Hurst | 195/31 |
| 3,560,343 | 2/1971 | Armbruster et al. | 195/31 |

OTHER PUBLICATIONS

Wallerstein Co., Data Sheet No. 236, "Enzyme W," 1964.
Wallerstein Co., Data Sheet No. 242, "Enzyme W," 1965.

*Primary Examiner*—A. Louis Monacell
*Assistant Examiner*—Gary M. Nath
*Attorney*—Pendleton, Neuman, Williams & Anderson

[57] ABSTRACT

Low conversion starch hydrolyzate products having dextrose equivalent values not substantially above 18 and characterized by a unique saccharide composition, good clarity and little tendency of retrogradation in solution. Methods for preparing low conversion starch hydrolyzates by a two-stage hydrolysis; hydrolysis in the first stage being carried out with acids or enzymes at elevated temperatures for short periods to achieve liquefaction of the starch with very little dextrinization or saccharification and the second stage of the hydrolysis being carried out at an alkaline pH with bacterial alpha-amylase to achieve a desired dextrose equivalent value.

9 Claims, 3 Drawing Figures

INVENTOR.
Alpha L. Morehouse
Ronald C. Malzahn
John T. Day
BY Pendleton, Neuman,
Seibold & Williams
Attorneys

HYDROLYSIS OF STARCH

This invention relates to starch hydrolyzate products and to preparation of such products.

It is known that starch can be hydrolyzed by means of acids or enzymes to produce hydrolyzate products containing sugars and which therefore are useful in foods. The sweetening property of the starch hydrolyzates depends to great extent upon the degree of conversion, that is, the extent to which the starch molecules have been hydrolyzed. A very common method of classifying starch hydrolyzates is to measure the degree of hydrolysis in terms of dextrose equivalent (D.E.) which is a measure of the reducing sugar content of the hydrolyzate calculated as dextrose and expressed as a percentage of the total dry substance. The dextrose equivalent value of a starch hydrolyzate is determined by the method of Smogyi, M. described in the Journal of Biological Chemistry 160, 61 (1945).

Starch hydrolyzates having a dextrose equivalent (D.E.) value below 40 are generally considered low conversion products whereas those having a D.E. value higher than 60 are considered high conversion products, with products having D.E. values therebetween being classified as regular or intermediate conversion products. The regular and high conversion hydrolyzates are usually produced in the form of clear, colorless, non-crystallizable, viscous liquids whereas low D.E. products can be produced in dry powdered form.

In addition to the above classification, starch hydrolyzates are also characterized or classified by the method used to accomplish the hydrolysis, that is, whether the hydrolyzates are converted by means of acids or enzymes. The acids and enzymes which are satisfactory for this purpose are well known in the art. The properties or characteristics of the starch hydrolyzates depend upon the degree of conversion to sugars as well as the means (acid or enzyme treatment) employed for hydrolysis. Accordingly, the type of starch hydrolyzate chosen for a particular use depends to great extent on its properties. Generally speaking, high D.E. starch hydrolyzate products are preferred with respect to fermentability, flavor enhancement, hygroscopicity and sweetening properties whereas low D.E. starch hydrolyzate products exhibit higher viscosities and are preferred with respect to cohesive and foam stabilizing properties. The low D.E. hydrolyzates are good bodying agents and retard crystallization of sugar. Thus, low D.E. starch hydrolyzate products are particularly useful in certain food applications in which such properties are important.

The applicability and use of low D.E. products and particularly products having a D.E. value of less than about 18 has been limited because of certain significant difficulties inherent in their production. Low conversion starch hydrolyzates which have been produced by methods heretofore known in the art are generally found to contain significant quantities of native or unconverted starch and thus are not uniform and have a tendency to retrograde with concomitant haze formation. Furthermore, such products may not be completely soluble and may, through deliquescence, become sticky as well as providing greater sweetening than is desired for many applications. The difficulties encountered in producing low conversion products by known methods as well as the poor properties of such products can possibly be attributed to certain inherent characteristics of the starch granules and also deficiencies in the known hydrolysis methods.

Starch is a naturally occurring polymer of $\alpha$–D glucose connected by acetal linkages. The acetal linkages are susceptible to both acid and enzyme hydrolysis and both catalysts are employed in preparing starch hydrolyzates. The acid hydrolysis of starch has been shown to be a random process and at a given time an acid hydrolyzed starch product comprises a mixture of many different molecular species which may range from the monomer glucose all the way up to polymers approaching the size of starch. Because of the wide range of molecular sizes obtained in acid hydrolysis it is customary to conduct the conversion to an extent that the long polymers will no longer react with iodine. Accordingly, acid hydrolysis is not well suited for making a low D.E. product, i.e., one having a D.E. value below about 30. Although the degree of hydrolysis can be reduced to obtain lower D.E. products the long polymers present in such products cause rapid retrogradation with an accompanying loss of solubility and clarity. Another disadvantage of hydrolyzing starch with acid is that significant amounts of glucose are always present in the product even when the degree of conversion is held to a low level. Because of the presence of glucose and other low molecular weight saccharides, even low D.E. acid-hydrolyzed products tend to be hygroscopic, sticky, and provide a sweetening effect greater than is desired for many applications.

The use of enzymes for hydrolyzing starch has gained widespread application in recent years and enzymes are employed commercially for manufacturing certain products. Enzymes have an advantage over acid catalysts in that they exhibit specificity for certain linkages. One type of microbial enzyme which is commonly employed is alpha-amylase. Alpha-amylase has the property of splitting 1–4 linkages more or less at random throughout the starch molecule with little effect on the 1–6 linkages. Moreover, alpha-amylase does not readily hydrolyze or split the 1–4 linkage in maltose and maltotriose. Thus, it has been reported that when substantially complete conversion of starch is effected with alpha-amylase, maltose and small amounts of trisaccharides and other lower molecular weight polysaccharides, especially those containing the 1–6 linkages, are present in the final hydrolyzate.

Another factor having bearing on the properties of starch hydrolyzates prepared by either acid or enzyme hydrolysis is the manner in which the starch is gelatinized when heated in water. The molecules of native starch are closely bound in the starch granule to a varying degree and those that are closely bound are not particularly susceptible to the action of enzymes. It is not until the starch molecules have been dispersed by swelling and gelatinization in water that significant hydrolytic cleavage will take place. In a conversion procedure where the starch is heated slowly the molecules which are closely bound are dispersed or gelatinized more slowly and therefore are available for attack by the acid or enzymes at much lower rate. The result of this non-uniform rate of gelatinization is that by the time that all of the resistant molecules have been made available for attack the more easily dispersed molecules will already have been reduced to a relatively small molecular range. When the product desired is a regular or high D.E. product the non-uniform degradation of starch is not a serious problem. However, when preparing a low D.E. hydrolyzate product the non-uniformity of gelatinization is particularly undesirable because a high proportion of very large molecules including some intact starch molecules will still be present when the desired low D.E. level is reached.

Another undesirable characteristic of low D.E. starch hydrolyzates produced heretofore by known methods, which is related to the non-uniformity of degradation, is the tendency for certain of the larger linear molecules to reassociate with other molecular fragments of starch to form large relatively insoluble aggregates. The rate and extent to which linear starch molecules reassociate into insoluble aggregates is a function of chain length since below a certain length the aggregational tendency is not great. The occurrence of reassociation in a liquid hydrolyzate is evidenced by the appearance of haze and/or a change to a gel or paste having poor solubility in cold water.

Although the reassociation or retrogradation of starch hydrolyzates occurs primarily in cooled hydrolyzates where it is especially objectionable it may occur to a slight extent during the cooking process if the rate of heating is slow. When this happens these molecular aggregates tend to remain intact during subsequent processing and add to the difficulty of filtering the hydrolyzate. The presence of a small amount of native or undegraded starch effectively precludes practical filtration procedures. Since the relative amount of residual starch is larger when limited starch conversion is effected in the case of low D.E. products, the filtration problem is more acute with these products. Any significant amount of retrogradation and its attendant production of insoluble reassociated fragments increases the filtration difficulty. Since filtration is one prerequisite for the production of an acceptable starch hydrolyzate food product (i.e. one that is substantially soluble and uniform in appearance, etc.) the difficulty in filtering low D.E. hydrolyzates has been one of the major obstacles to commercialization of low D.E. starch hydrolyzate products.

It is therefore a principal object of the present invention to provide methods for producing low conversion starch hydrolyzates which methods possess advantages over prior art methods of converting starch.

Another object of the present invention is to provide methods for producing low conversion starch hydrolyzate products which are of good clarity and which can be readily filtered.

It is a further object of the present invention to provide advantageous methods for producing starch hydrolyzates having dextrose equivalent values not substantially above 18.

Another object of the present invention is to provide novel low conversion starch hydrolyzate products.

A further object of the present invention is to provide high clarity, non-retrograding, non-deliquescent starch hydrolyzate products having dextrose equivalent values not above 18.

In accordance with the present invention a starch is slurried in water to a solids concentration from about 10 to 40, preferably 20 to 30 percent by weight. All varieties of starch or starch products or amylaceous materials can be employed such as, for example, potato, milo, wheat, sweet potato, tapioca and the like. Pure corn starch is preferred however. To the aqueous starch slurry is added alpha-amylase, preferably bacterial alpha-amylase, or an acid such as hydrochloric, oxalic or sulfuric acid and the like. The slurry is then maintained at a relatively high temperature for a short period of time to achieve substantially complete liquefaction of the starch. In this stage of the process starch is liquefied, that is, the starch granules are pasted and the starch hydrated and dispersed to such an extent that hydrolytic cleavage of the starch molecules can be readily accomplished. During this liquefaction stage, dextrinization of the starch is not permitted to progress to a stage where the dextrose equivalent value thereof is substantially above 3. Thus, the first step of the present process, the liquefaction stage, is that period in which the starch granules become swollen and dispersed and is continued until substantially all of the starch has been gelatinized as determined by the absence of birefringence. It is an important feature of the present process that dextrinization of the starch is suppressed or minimized until substantially complete liquefaction is achieved and the liquefaction is thus conducted under conditions which permit accomplishment of these desiderata. The starch liquefaction can be carried out in any suitable equipment which permits the starch slurry to be maintained at an elevated temperature and which preferably is provided with means for agitating the slurry. A high temperature, i.e. one above 90° C. and preferably about 92° to 95° C., is employed in this step. There are interdependent relationships between temperature, pH, time, and type of treating agent employed with respect to accomplishing substantially complete liquefaction with minimum dextrinization and each is susceptible to variation within limits.

To accomplish liquefaction with alpha-amylase, the enzyme is generally employed in amounts from about 2,500 to 9,000, preferably 3,000 to 6,000 SKB units per pound of starch. The pH of the starch slurry is adjusted to a pH of from about 6 to 8, preferably 6.5 to 7.5, and maintained at an elevated temperature above 90° C. for a short period to achieve substantially complete liquefaction of the starch. Thus, for example, with a purified alpha-amylase employed in amounts from about 3,600 to 7,200 SKB units per pound, substantially complete liquefaction of a starch slurry having a solids content of from 20 to 30 percent and having a pH of 6.5 to 7.5 is generally accomplished in a period of 5 to 20 minutes at temperatures of from 90° to 95° C.

When an acid such as hydrochloric acid is employed for liquefaction, the acid is generally employed in amounts to provide a hydrogen chloride normality in the starch slurry within the range 0.02 to 0.12, preferably 0.02 to 0.04. The slurry is maintained at a high temperature such as from 100° to 160° C. for a short period to achieve substantially complete liquefaction of the starch. For example, with a starch slurry containing from 20 to 30 percent by weight solids, a mineral acid such as hydrochloric acid is added to adjust the acidity of the slurry to about 0.06 normal. The acidified slurry is then pumped into a reactor and heated to 100° C. for a period of about 3 or 4 minutes. The slurry is then cooled and neutralized by addition of an alkaline material such as sodium hydroxide.

In any event, using either acids or enzymes the liquefaction step is conducted in accordance with the invention under conditions which result in substantially complete gelatinization of the starch with the dispersion being substantially free of residual starch granules and the measurable dextrose equivalent value thereof not exceeding about 3.

After liquefaction is substantially complete the liquefied starch is then treated with a dextrinizing enzyme system to achieve an ordered progressive dextrinization of the starch to produce a final hydrolyzate product having a dextrose equivalent value not substantially above 18. In a preferred embodiment the starch hydrolyzate is one having a D.E. Value of between 8 and 18. In this dextrinization stage of the process the liquefied starch molecules are hydrolyzed to progressively shorter fragments. Thus, in the process of the present invention the liquefaction and dextrinization reactions occur consecutively rather than simultaneously and thus provide a narrow spectrum of sizes of starch fragments. In prior art starch hydrolysis processes liquefaction, dextrinization and saccharification occur simultaneously and since the rate of dextrinization is greater than the rate of liquefaction, particularly for those starch fractions which are refractory to pasting, considerable dextrinization occurs before liquefaction is complete with the result the starch hydrolyzate product is composed of a wide spectrum of starch fragments.

The dextrinization step is accomplished by treating the liquefied starch slurry with a dextrinizing enzyme such as alpha-amylase, particularly bacterial alpha-amylase. It is preferable to carry out the dextrinization step as a batch reaction. The dextrinizing enzyme is generally employed in amounts to provide from about 300 to 3,000 SKB units. Any excess of the agent employed for the liquefaction is permitted to remain in the slurry during the dextrinization step, which step is conducted at a temperature of 65° to 85° C., preferably 74° to 80° C., and at a pH of from 7.0 to 9.0, preferably 7.5 to 8.5, for a time sufficient to produce a hydrolyzate product having the desired D.E. Value, preferably a value between 8 and 18. Generally, under these conditions, dextrinization or starch conversion to the desired extent is achieved in periods ranging from about 30 to 120 minutes. When the dextrinization has progressed to the desired extent and the desired D.E. value achieved, the reaction is stopped by acidifying the hydrolyzate to a pH of 4 or below or by heating to a temperature sufficient to inactivate the dextrinizing enzyme, such as a temperature of 100° C. or above. The hydrolyzate can then be readily filtered using conventional filtration equipment and can be concentrated if desired.

An important characteristic of starch hydrolyzates prepared by the two-stage process of the present invention is the relatively low amount of high molecular weight fragments present therein, which fragments are believed to cause retrogradation, gel formation and haze in the final product. The hydrolyzate products of this invention generally contain such low amounts of high molecular weight components that aqueous dispersions remain fluid and free of opacity at all solid concentrations below the following maximums for specified D.E. values:

| D.E. of Hydrolyzate | Maximum solid concentration remaining fluid and free of opacity* |
|---|---|
| 8 | 10% |

| | |
|---|---|
| 10 | 20 |
| 12 | 35 |
| 14 | 50 |
| 16 | 65 |
| 18 | 80 |

*By "free of opacity" is meant that the transmittance of light rays through the hydrolyzate maintained at 10° C. over a period of 48 hours is at least 70%.

The starch hydrolyzates of the invention are unique in that they have a D.E. value below 18 and contain not more than 1 percent by weight of glucose and not more than 6 percent maltose and yet remain fluid and free of opacity as indicated above. The oligosaccharide composition of the final hydrolyzate product having D.E. values between 8 and 18 is generally as follows, as determined by chromatography:

| D.E. of hydroly- zate | Degree of polymerization (D.P.*) in percent by weight ||||||||||
|---|---|---|---|---|---|---|---|---|---|---|
| | 1 | 2 | 3 | 4 | 5 | 6 | 7 | 8 | 9 | 10 | Over 10 |
| 8 | 1 | 3.5 | 5 | 4.5 | 4 | 6.5 | 6 | 4 | 2.5 | 2 | 65 |
| 10 | 1 | 5 | 6.5 | 5.5 | 4.5 | 9 | 8 | 5 | 3 | 1 | 52 |
| 12 | 1 | 5.5 | 7.5 | 6.5 | 5.0 | 11 | 10 | 5.5 | 3 | 1 | 40 |
| 14 | 1 | 5.5 | 8.5 | 6.5 | 5.5 | 13 | 12 | 6 | 3 | 1 | 35 |
| 16 | 1 | 5.5 | 9.5 | 7 | 6 | 15 | 13.5 | 6 | 2.5 | 1 | 30 |
| 18 | 1 | 6.0 | 10 | 7 | 6.5 | 17 | 15.5 | 6 | 2.5 | 1 | 24 |

*D.P. means degree of polymerization of glucose. For example, $DP_1$ =glucose, $DP_2$=maltose, etc.

The discussion in the following examples will further illustrate the present invention and the advantages thereof.

EXAMPLE 1

A starch slurry was prepared using unmodified industrial corn starch, water, alpha-amylase and calcium chloride. The slurry had the following composition:

| | |
|---|---|
| Pearl Starch | 1200 grams |
| Tap Water | 4800 grams |
| $CaCl_2$ | 0.6 gram |
| Alpha-amylase (3300 SKB $\mu$/gm) | 5 grams equals 6000 SKB units/lb. starch |
| pH | 7.7 |

The starch slurry was pumped at a controlled rate through a two-stage converter which consisted of two round bottom flasks with heating mantles and stirrers. Peristaltic pumps were employed to move material through the system. The following steady state conditions were established for each stage:

| | First Stage (Liquefaction) | Second Stage (Dextrinization) |
|---|---|---|
| Volume | 500 ml. | 1000 ml. |
| Rate of addition and withdrawal | 25 ml./min. | 25 ml./min. |
| Residence time | 20 min. | 40 min. |
| Temp. °C. | 91° C. | 76° C. |

A solution of alpha-amylase was added dropwise to the second stage of the converter at a rate providing 600 SKB units amylase per pound of starch. The converted hydrolyzate which was removed continuously from the second stage flask was adjusted to pH 3.5 by the addition of dilute hydrochloric acid to stop the dextrinization.

The hydrolyzate produced had a dextrose equivalent value (D.E.) of 12.3. A sample of the crude hydrolyzate filtered readily using a small amount of filter aid and standard laboratory filtration equipment.

EXAMPLE 2

Calcium chloride and alpha-amylase were added to 8 liters of a starch milk to obtain a slurry of the following approximate composition:

| | |
|---|---|
| Dry Starch | 2200 grams |
| $CaCl_2$ | 0.8 gram |
| Alpha-amylase | 2.4 grams (Provides 6000 SKB units/lb. starch) |
| pH | 7.8 |
| Water | 6600 grams |

The starch slurry was pumped through a series of three stirred reactors in series using peristaltic pumps to maintain a continuous flow into and out of each reactor. The first reactor was used for the primary liquefaction step while the second and third reactors were used for the dextrinization step. A high state of agitation was maintained in the first reactor and the starch slurry was added so that it was thoroughly dispersed and almost instantly gelatinized the moment it was added to the reactor. The following steady state conditions were established in each stage of the converter:

| | Liquefaction 1st stage | Dextrinization 2nd stage | 3rd stage |
|---|---|---|---|
| Amylase SKB $\mu$/lb. | 6000 | 600 | — |
| Volume ml. | 1000 | 500 | 500 |
| Rate of addition and withdrawal, ml./min. | 50 | 50 | 50 |
| Residence time, min. | 20 | 10 | 10 |
| Temperature, °C. | 91 | 76 | 76 |

Samples were collected from the third stage and acidified to pH 3.5. A composite sample was filtered, treated with decolorizing carbon and evaporated to a colorless syrup containing 72 percent solids and having a D.E. of 15.6. No significant haze developed during storage at room temperature.

EXAMPLE 3

A 20 percent solids starch slurry was prepared as follows:

| | |
|---|---|
| Pearl Starch | 3560 grams |
| Tap Water | 12440 grams |
| $CaCl_2$ | 3.2 grams |
| pH | 7.5 |
| Amylase | 2400 or 4800 SKB units/lb. starch as indicated below |

The starch slurry was pumped continuously through a stirred reactor for liquefaction and then through a 100-foot ½-inch tubular reactor. The steady state conditions were as follows:

| Liquefaction |||| Dextrinization ||||
|---|---|---|---|---|---|---|---|
| Temp., °C. | Amylase | pH | Res. time, min. | Product D.E. | Temp., °C. | Amylase | pH | Res. time, min. | Product D.E. |
| 95 | 2,400 | 7.5 | 5 | 1.4 | 76 | 1,200 | 7.0 | 50 | 6.4 |
| 95 | 4,800 | 7.5 | 5 | 1.9 | 76 | 1,200 | 7.0 | 50 | 14.9 |
| 95 | 2,400 | 7.5 | 10 | 1.4 | 76 | 1,200 | 7.0 | 75 | 12.2 |
| 95 | 4,800 | 7.5 | 10 | 2.1 | 76 | 1,200 | 7.0 | 75 | 12.2 |

EXAMPLE 4

An aqueous slurry of unmodified industrial corn starch was adjusted to 12° Be and acidified with hydrochloric acid as follows:

| | |
|---|---|
| 12° Be starch slurry | 50 gal. |
| 5N hydrochloric acid | 0.53 gal. |
| Final pH of starch slurry | 1.8 |

The starch slurry was continuously pumped through a pilot model Kroyer cooker where the starch was rapidly heated to a temperature of 96°–98° C. and held at this temperature for sufficient time to liquefy the starch and hydrolyze to a D.E. of about 3. Samples of the liquefied starch were collected and neutralized to about pH 7.5 by the addition of 2N sodium hydroxide. The samples were cooled to 78° C. and treated with bacterial alpha amylase for periods of 1–2 hours to convert to a D.E. less than 18. The conversion was stopped by acidification to pH 4 which inactivated the amylase.

The conditions and results for two samples prepared by the acid-enzyme procedure just described were as follows:

CONDITIONS

| Sample number | Liquefaction | | | | Dextrinization | | | | |
|---|---|---|---|---|---|---|---|---|---|
| | Conc. HCl | Temp., °C. | Res. time | D.E. | pH | Temp., °C. | Amylase, g.p. u./lb. | Res. time | Product D.E. |
| 1 | .06N | 98 | 3':35" | 2.6 | 7.2 | 76 | 600 | 60' | 15.5 |
| 2 | .06N | 100 | 3':35" | 3.7 | 7.5 | 76 | 800 | 60' | 16.9 |

RESULTS, SACCHARIDE PROFILE

| Sample number | D.E. | Percent composition, D.P. | | | | | | |
|---|---|---|---|---|---|---|---|---|
| | | 1 | 2 | 3 | 4 | 5 | 6 | 7 |
| 1 | 15.5 | 0.51 | 4.29 | 7.37 | 7.48 | 5.72 | 10.2 | 11.8 |
| 2 | 16.9 | 0.10 | 5.54 | 8.76 | 6.94 | 4.81 | 12.9 | 9.20 |

These results show that when starch is liquefied with acid to a D.E. of about 3 followed by enzymatic dextrinization the resulting product has a saccharide profile which closely resembles that produced by enzyme liquefaction, i.e., the glucose value is less than 1 percent and the maltose content does not exceed 6 percent. Also, the hydrolyzates can be concentrated to a syrup of 60 percent solids concentration which syrups remain clear at 10° C. for more than 48 hours. Thus, it is apparent that either acid or enzyme liquefaction can be employed in carrying out the present invention, the critical factor being that the D.E. produced during liquefaction by either acid or enzyme does not progress beyond a D.E. value of about 3.

EXAMPLE 5

This example illustrates the effect of the initial temperature employed in the liquefaction stage on filtration rate, sludge and haze formation in the final hydrolyzate product.

A 20% solids starch slurry was prepared as follows:

| Pearl Starch | 3560 grams |
|---|---|
| Tap Water | 12440 grams |
| CaCl$_2$ | 3.2 grams |
| pH | 7.5 |
| Amylase | 3000–6000 SKB units/lb. starch as indicated below. |

The starch slurry was pumped through a continuous laboratory converter consisting of two stirred reactors in both of which liquefaction was achieved. In the second reactor an intermediate stage of liquefaction was achieved at a temperature higher than that employed in the first stage of liquefaction. In all cases after liquefaction dextrinization was accomplished in a tubular reactor. Additional alpha-amylase was added just ahead of the tubular reactor. Samples of the crude hydrolyzates were compared for filterability and sludge. Haze formation was measured after filtration and concentration to 50 percent solids.

The conditions existing after a steady state had been attained are given in the following table.

As can be seen from the above table, the sludge present in the sample which was liquefied at a constant temperature of 76° C. was very high and the filtration rate of the sample was very low. The clarity of the sample was very good, however. Likewise, the sample which was liquefied at an initial temperature of 76° C. with the liquefaction being completed at a temperature of 97° C. was relatively high in sludge and the filtration rate was poor. The clarity of this sample was also poor. In contrast, the two samples which were liquefied at the higher temperatures were low in sludge and the filtration rate of both samples was good. The clarity of these samples was also good. The sample liquefied at 91° C. initially with the liquefaction being completed at 97° C. was superior with respect to filtration rate and sludge formation. These data illustrate the importance of conducting the liquefaction step of the present process at a high temperature, that is, a temperature above 90° C.

Figure 1:
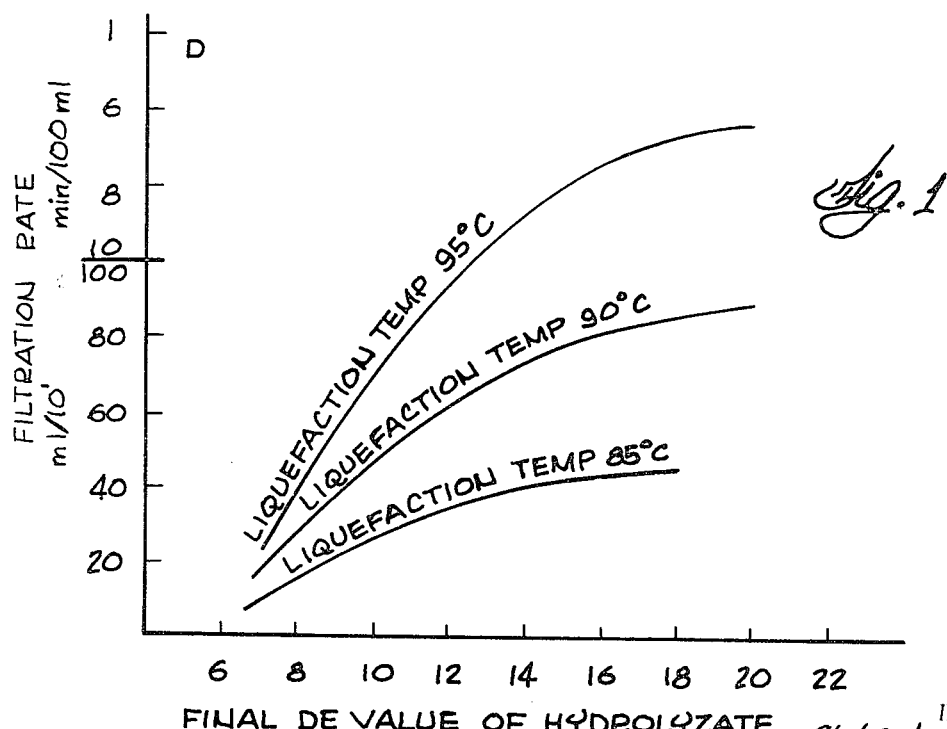

FIG. 1 of the drawing is a graph illustrating the relationship between the temperature employed for liquefaction and the filtration rate of the final starch hydrolyzate. As can be seen from the plotted data, the filtration rate of the starch hydrolyzate liquefied at a temperature of 95° C. was significantly better than the starch hydrolyzates in which liquefaction was carried out at lower temperatures.

A low dextrose equivalent value starch hydrolyzate prepared in accordance with the invention was compared with starch hydrolyzates prepared by prior art processes. Thus, the starch hydrolyzates were prepared as follows:

Method 1 Conversion Process of Present Invention

A starch slurry was prepared as follows:

| Pearl Starch | 3700 grams |
|---|---|
| Tap Water | 12 liters |
| CaCl$_2$ | 3.2 grams |
| Alpha-amylase | 12.5 grams (12,000 SKB u/lb. starch) |
| pH | 7.7 |

The starch slurry was continuously liquefied in a stirred reactor at 91°–92° C. with a 25-minute residence time. Samples of the liquefied starch were then dextrinized in batches with 1,200 SKB units amylase/lb. at 76° C. for 10, 30 and 60 minutes. The dextrinization was stopped by acidifying to pH 3.5.

Method 2 Prior Art Enzyme Conversion Process

A starch slurry was prepared with the following composition:

| Pearl Starch | 935 grams |
|---|---|
| Tap Water | 3065 grams |
| CaCl$_2$ | 0.8 gram |
| Alpha-amylase | 0.77 gram (3000 SKB units/lb. starch |
| pH | 7.0 |

The starch slurry was stirred and heated slowly to 76° C. and held at that temperature 15 minutes. The starch slurry was then heated to 97° for 10 minutes, cooled to 76° and treated again with alpha-amylase (1,200 SKB u/lb.). Samples were taken at 10 and 60 minutes and acidified to pH 3.5.

Method 3
Prior Art Acid Conversion Process

| Liquefaction stage | | | | | Intermediate stage | | | Dextrinization stage | | | | | | |
|---|---|---|---|---|---|---|---|---|---|---|---|---|---|---|
| 1st stage | | | | | | | | 2nd stage | | | | Crude product | | |
| Temp., °C. | Amylase | pH | Res. time, min. | D.E. | Temp., °C. | Res. time, min. | pH | Temp., °C. | Amylase | Res. time, min. | Filtr. rate* | Sludge, percent | D.E. | Clarity |
| 76 | 3,000 | 7.5 | 30 | 6.3 | | | 7 | 76 | 300 | 50 | 25 ml | 45 | 16.3 | Good. |
| 76 | 3,000 | 7.5 | 30 | 6.3 | 97 | 10 | 7 | 76 | 1,800 | 50 | 88 ml | 6.5 | 16.7 | Poor. |
| 91 | 6,000 | 7.5 | 30 | 3.2 | | | 7 | 76 | 1,200 | 50 | 4'30" | 2.0 | 13.6 | Good. |
| 91 | 6,000 | 7.5 | 30 | 3.2 | 97 | 10 | 7 | 76 | 1,800 | 75 | 2'30" | 0.5 | 12.3 | Do. |

*Filtration rate: Volume of filtrate in 10 minutes through a 9 centimeter funnel at 29" vacuum or time to filter 100 milliliters of hydrolyzate.

A slurry of starch and acid was prepared using 400 grams pearl starch and 1,600 grams 0.06 N hydrochloric acid. The starch slurry was stirred and heated slowly so that the temperature reached 97° after 1 hour. Samples were taken after 90, 113 and 140 minutes and neutralized to pH 4–5 with sodium carbonate.

The samples from each of the three conversion methods were compared for ease of filtration and sludge (i.e. suspended solids). After filtration and evaporation to the syrup stage the hydrolyzates were observed for differences in clarity. The results are reported in the table below.

[Comparison of low D.E. starch hydrolyzates prepared by different methods]

| Method of preparation | Crude hydrolyzate | | Final syrup | | |
|---|---|---|---|---|---|
| | Filtration rate*, ml./min. | Sludge, percent by volume | Percent dry substance | D.E. | Clarity |
| Method 1 | 80/10 | 6 | 48 | 8 | Opaque gel. |
| | 100/6 | 2 | 64 | 15 | Clear. |
| | 100/6 | 3 | 71 | 17 | Do. |
| Method 2 | 9/10 | 2.5 | 67 | 15 | Opaque paste. |
| | 15/10 | 2.0 | 61 | 17 | Haze. |
| Method 3 | 100/3 | 15 | 58 | 13 | Opaque paste. |
| | 100/4 | 10 | 68 | 18 | Do. |
| | 100/3 | 10 | 72 | 33 | Do. |

*Filtration test, 100 milliliters crude sample plus 1 gram filter cel at room temperature was filtered through a 9 centimeter Buchner funnel under 28 in. of Hg vacuum.

The above results show that the crude hydrolyzate prepared in accordance with the invention (Method 1) was much easier to filter than that prepared by Method 2. Another striking difference in the three methods was in the clarity and stability of the final syrups which were obtained by each process. All of the concentrates from Method 3 (acid hydrolysis) became opaque gels or pastes within 24 hours at room temperature. Thus, it is evident that low D.E. hydrolyzates by prior art acid conversion techniques contain a rather high proportion of longer chain molecules which induce retrogradation and gel formation.

The final product from both Methods 1 and 2 was markedly superior to that from the acid process (Method 3) with respect to clarity and retrogradation. However, for a given D.E., the product prepared by the new process of the present invention was substantially better than the product obtained by either of the prior art conversion methods. The differences in clarity and retrogradation properties is evidence that the method of the invention results in a more uniform hydrolysis in which the hydrolyzate product is low in long chain linear molecules which are believed to cause haze and retrogradation.

FIG. 2 is a graph illustrating the relationships of dextrose equivalent values and the maximum percentage of solids which can be present in starch hydrolyzates produced by the process of the present invention and prior art processes, with the hydrolyzates remaining fluid and free of haze (opacity). The data plotted in FIG. 2 was obtained by carrying out the hydrolysis of starch by three methods similar to those described above. From the plotted data it will be seen that the process of the present invention provides starch hydrolyzates which remain fluid and free of haze at much higher solids concentrations than can be obtained by prior art acid or enzyme hydrolysis processes. The plotted data of FIG. 2 with respect to the starch hydrolyzates of the invention can be expressed mathematically by the equation 7.5 times dextrose equivalent minus 55 equals maximum solids concentration for a fluid hydrolyzate free of opacity.

Figure 3:
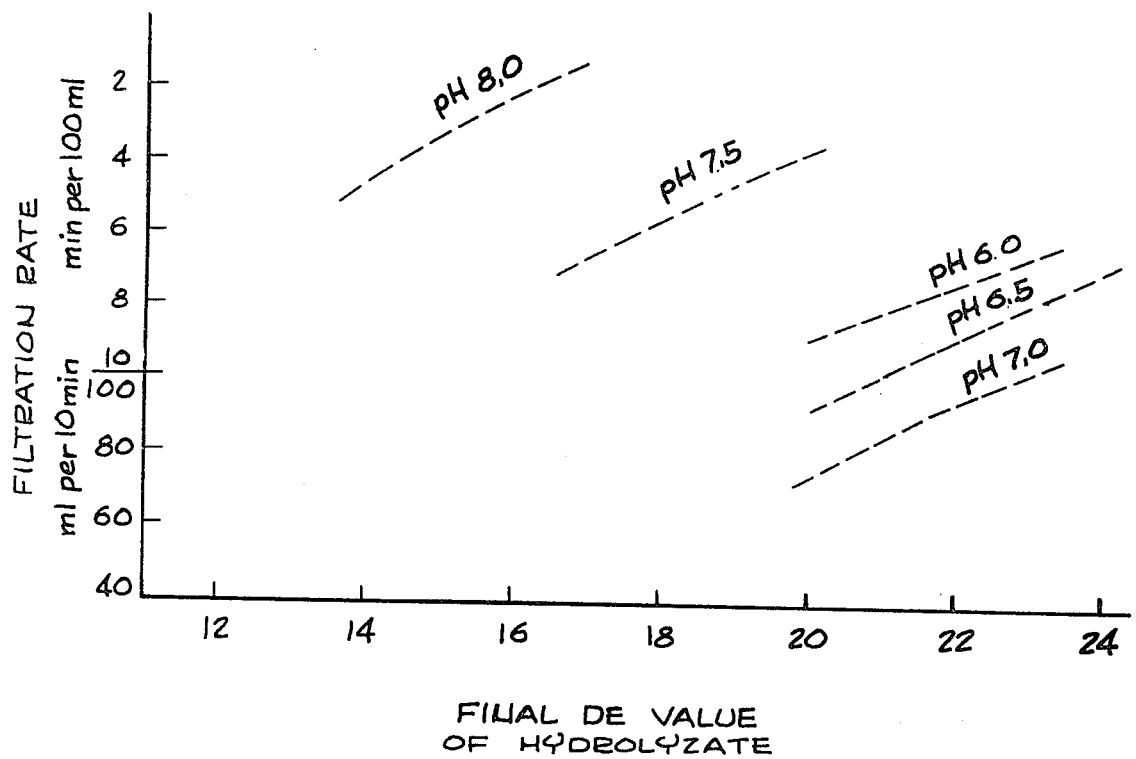

As previously indicated, the dextrinization step of the present process is carried out at a pH in the range from 7.0 to 9.0 and preferably at a pH of 7.5 to 8.5. The filterability of the starch hydrolyzates is significantly affected by the pH employed in the dextrinization step. The effect of pH is graphically illustrated by the data plotted in FIG. 3. This data was obtained by liquefying a starch hydrolyzate at a temperature above 90° C. and then carrying out the dextrinization thereof at a temperature of 76° C. with bacterial alpha-amylase at different pH values. As can be seen from the plotted data, the filtration rate of the starch hydrolyzates was superior when higher pH values were employed in the dextrinization step. This is true in the case of starch hydrolyzates having lower D.E. values even though such products are usually more difficult to filter.

The advantages of the present process are apparent from the foregoing discussion. It will be seen that by the process of the present invention unique starch hydrolyzates of low dextrose equivalent value (18 or below) are obtained. These starch hydrolyzates, containing not more than 1 percent glucose or more than 6 percent maltose, remain free of opacity when the solids content thereof is as high as 80 percent for a product having a dextrose equivalent value of 18. Moreover, the low conversion starch hydrolyzates can be readily filtered using conventional filtration techniques and they exhibit little tendency to retrograde in solution. The unique starch hydrolyzates are particularly adapted for use in foods where non-retrograding and non-deliquescent properties are particularly important such as icings and glazes, coffee whiteners, fruit and beverage powders, spice blends and foods where a bland flavor, low sweetness and a low tendency to cake or become sticky is important.

Throughout this application, enzyme activity is expressed as SKB units as determined by the assay method of Sandtedt, R.M., Kneen, E., and Blish, M.J. described in Cereal Chemistry 16, 712 (1939).

Those modifications and equivalents which fall within the spirit of the invention and the scope of the appended claims are to be considered part of the invention.

We claim:

1. A process for producing a starch hydrolyzate which comprises treating in a first step an aqueous slurry of starch with an acid or enzyme to liquefy the starch and to provide an aqueous dispersion substantially free of residual starch granules with a measurable dextrose equivalent value not substantially above 3, then subsequently in a second step treating the said dispersion with a dextrinizing enzyme to achieve a hydrolyzate product having a measurable dextrose equivalent value not substantially above 18, stopping the dextrinization reaction and recovering the hydrolyzate so produced.

2. A process in accordance with claim 1 wherein dextrinization is carried out using a bacterial alpha-amylase at a temperature from about 65° to 85° C. and a pH of from 7 to 9.

3. A process in accordance with claim 1 wherein dextrinization is carried out using a bacterial alpha-amylase at a temperature from about 74° to 80° C. and at a pH from about 7.5 to 8.5.

4. A process in accordance with claim 1 wherein dextrinization is carried out under conditions to produce a hydrolyzate product having a dextrose equivalent value from about 8 to 18.

5. A process for producing a starch hydrolyzate which comprises treating an aqueous slurry of starch with an acid or enzyme at a temperature above 90° C. to liquefy the starch and to provide an aqueous dispersion substantially free of residual starch granules with a measurable dextrose equivalent value not substantially above 3, then treating the said dispersion with a dextrinizing enzyme at a temperature below 85° C. to achieve a hydrolyzate product having a dextrose equivalent value not substantially above 18, stopping the dextrinization reaction and recovering the hydrolyzate so produced.

6. A process in accordance with claim 5 wherein liquefaction is carried out using alpha-amylase at a temperature above 90° and at a pH of from about 6 to 8.

7. A process in accordance with claim 5 wherein liquefaction is carried out using alpha-amylase at a temperature from about 92° to 95° C. and at a pH of from about 6.5 to 7.5.

8. A process in accordance with claim 5 wherein liquefaction is carried out using an acid at a temperature from about 100° to 160° C.

9. A starch hydrolyzate having a dextrose equivalent value between 8 and 18 and a saccharide composition wherein the amount of glucose present is less than 1 percent by weight and the amount of maltose is less than 6 percent by weight, said hydrolyzate being further characterized as producing a fluid solution free of opacity (transmittance of light rays through the solution maintained at 10° C. over a period of 48 hours is at least 70 percent) when the hydrolyzate is added to water at solids concentrations specified below:

| Dextrose equivalent of Hydrolyzate | Solids Concentration |
|---|---|
| 8 | 10 |
| 10 | 20 |
| 12 | 35 |
| 14 | 50 |
| 16 | 65 |
| 18 | 80 |

* * * * *

Disclaimer 3,663,369.—*Alpha Morehouse; Ronald C. Malzahn* and *John T. Day,* Muscatine, Iowa. HYDROLYSIS OF STARCH. Patent dated May 16, 1972. Disclaimer filed Apr. 15, 1981, by the assignee, *Grain Processing Corp.*

Hereby enters this disclaimer to claims 1 through 9, inclusive of said patent.

[*Official Gazette July 14, 1981.*]